United States Patent

[11] 3,586,889

[72] Inventor Roland K. Kolter
Dearborn, Mich.
[21] Appl. No. 773,172
[22] Filed Nov. 4, 1968
[45] Patented June 22, 1971
[73] Assignee GCO, Inc.
Ann Arbor, Mich.

[54] MEANS FOR RESILIENTLY MOUNTING TRANSDUCER ELEMENTS BETWEEN A HOUSING AND AN INERTIAL MASS
3 Claims, 4 Drawing Figs.

[52] U.S. Cl. .................................................... 310/8.4,
310/8.6, 310/8.7, 310/8.9, 310/9.2, 340/10
[51] Int. Cl. .................................................... H04r 17/00
[50] Field of Search .......................................... 310/8.9,
9.0, 8.7, 8.3, 9.1—9.4, 8.0—8.2, 8.4, 8.5, 8.6;
340/10, 17; 73/74

[56] References Cited
UNITED STATES PATENTS

| | | | |
|---|---|---|---|
| 2,260,842 | 10/1941 | Schwartzhaupt ............ | 310/9.2 X |
| 2,425,594 | 8/1947 | Brown ......................... | 340/10 |
| 2,638,556 | 5/1953 | Hausz .......................... | 310/8.4 |
| 2,639,393 | 5/1953 | Birt et al. ...................... | 310/9 X |
| 3,006,280 | 10/1961 | Rogers et al. ................. | 310/9 X |
| 3,283,590 | 11/1966 | Shang .......................... | 310/8.4 UX |
| 3,304,534 | 2/1967 | Sykes .......................... | 340/10 |

*Primary Examiner*—Milton O. Hirshfield
*Assistant Examiner*—Mark O. Budd
*Attorney*—Hauke, Krass, Gifford & Patalidis

ABSTRACT: A piezoelectric disc of an electromechanical transducer is disposed between opposing cavities formed in metal fixtures. The cavities are filled with a resilient electrical conductive material of low volume compressibility such as conductive rubber. The metal fixtures, the opposite faces of the disc and the areas of conductive material are electrically insulated from one another by insulating rubber material.

INVENTOR
ROLAND K. KOLTER

BY Hauke, Krass, Gifford, & Patalidis
ATTORNEYS

MEANS FOR RESILIENTLY MOUNTING TRANSDUCER ELEMENTS BETWEEN A HOUSING AND AN INERTIAL MASS

BACKGROUND OF THE INVENTION

1. Field of the Invention

The present invention relates to electromechanical transducer devices and more particularly to a new means for mounting the piezoelectric transducer material in place.

2. Description of the Prior Art

The introduction of artificial piezoelectric materials such as bariumtitanates or leadzirconates as the transducer element of electromechanical transducer devices in place of the previously commonly used materials such as quartz has led to a number of problems in such devices.

These materials have a much lower tensile strength than quartz or the metals generally used in transducer devices such as ultrasonic transducers and the like. Because of this weakness it is necessary to more securely clamp the piezoelectric disc in place to compensate for the dynamic forces produced during vibrations of larger amplitude and to evenly distribute the clamping pressures over the entire surface of the piezoelectric member.

Further, the response of such materials will be degraded if irregularities such as deformation or cracks are present in the disc. This has necessitated careful manufacturing techniques to produce discs of optical flatness. To provide the necessary clamping, various cementing techniques have been employed but these prevent the transducer from being disassembled or repaired. Another method has been to enclose the transducer material in a liquid such as oil under high pressure. This, however, requires added equipment and has been found not to work well in some transducer devices such as ultrasonic devices.

SUMMARY OF THE PRESENT INVENTION

The present invention provides a new means for mounting ceramic piezoelectric elements within transducer devices such as ultrasonic transducers and the like. The element is supported on each face by a cavity filled with resilient electrical conductive material of low volume compressibility such as conductive rubber. In this way the effects of local deformations and small cracks in the piezoelectric element are substantially reduced and the resonance curves of the devices are more regular than with previous mounting techniques. Further, the devices can be disassembled for inspection or repair and the necessary clamping pressures are provided.

DESCRIPTION OF THE DRAWINGS

A better understanding of the present invention can be had by reference to the following description of several preferred embodiments thereof. The description makes reference to the following drawings in which like reference characters refer to like parts throughout the several views and in which.

DESCRIPTION OF SEVERAL PREFERRED EMBODIMENTS

Figure 2:
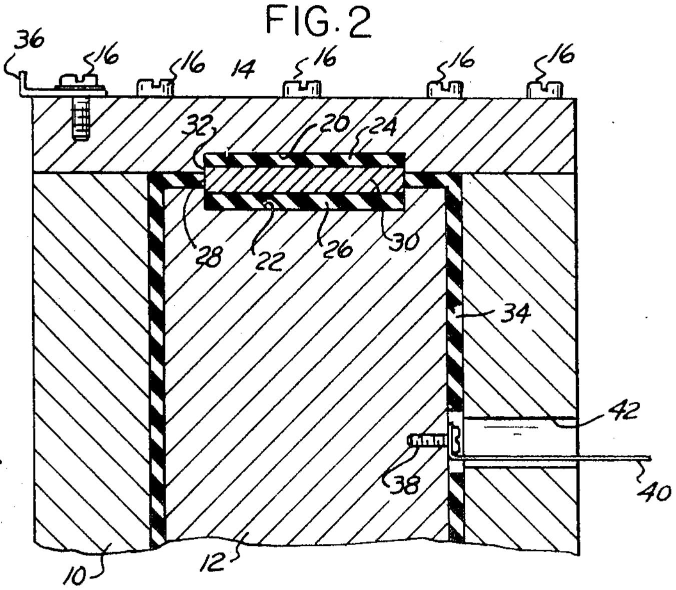
FIG. 2 is a fragmentary cross-sectional view taken substantially at line 2–2 of FIG. 1 and enlarged somewhat for purposes of clarity.
Figure 1:
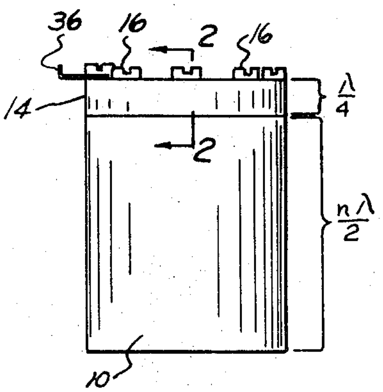
FIG. 1 is an elevational view of an ultrasonic transducer device utilizing the mounting means of the present invention.

Now referring to the drawings for a more detailed description of the present invention an ultrasonic transducer device is illustrated in FIGS. 1—2 as utilizing the preferred mounting means of the present invention.

The ultrasonic transducer preferably includes a tubular housing 10 axially slidably supporting an inner mass member 12. A cover 14 is mounted to the housing 10 by a plurality of screws 16.

The cover 14 and the inner member 12 are each provided with a substantially cylindrical flat cavity 20 and 22 respectively. Discs 24 and 26 of resilient, electrical conductive material of low volume compressibility such as conductive rubber or the like are disposed in the cavities 20 and 22 respectively and a disc 28 of piezoelectric material is mounted therebetween. The disc 28 is provided with opposing circular faces 30 and 32 engaging the rubber discs 24 and 26 respectively.

The spaces between the inner member 12 and the housing 10 and between the inner member 12 and the cover 14 are filled with a suitable rubber material 34 having electrical insulating characteristics. One of the screws 16 is provided with an electrical connector 36 so that the face 30 of the disc 28 is electrically connected to the connector 36 through the conductive disc 24, the cover 14 and the screw 16.

The screw 38 serves as a means for electrically connecting an electrical lead 40 to the inner member 12. The lead 40 extends through an opening 42 in the housing 10 and because the inner member 12 oscillates during use, it is necessary to make the opening 42 long enough to accommodate the movement of the lead 40 as produced by movement of the inner member 12.

As best shown in FIG. 1 for best results the cover 14 is preferably one-quarter wavelength thick and the length of the inner member 12 is preferably some multiple of a half of a wavelength. The disc 28 can be of any of the materials commonly used for this purpose such as bariumtitanates, leadzirconates or the like, and can be of a single layer construction as shown or if preferred, can be of a sandwiched construction.

As the device is illustrated in FIGS. 1—2, the inner member 12 will mechanically resonate at the resonance frequency of the transducer. The particular means for mounting the disc 28 in place cuts through the discs to evenly distribute the clamping pressures over the faces 30 and 32 of the disc 28. The discs 24 and 26 are electrical conductive and in addition to serving as a mounting means also act as the electrodes for the device. Because these discs are of a resilient material their faces will conform to minor irregularities on the surfaces of the disc 28 to thereby provide a more accurate device. The discs 24 and 26 are only locally resilient because of the incompressibility and because of the method of restraint, so that the vibrations of the member 12 will be accurately transmitted to the disc 28.

It is apparent that the particular means for mounting the piezoelectric disc 28 provides all of the advantages of previously utilized methods for this purpose while avoiding a number of the disadvantages. The surface connections and even distribution of clamping pressures achieved by cementing techniques are provided by the present invention. Unlike cementing techniques, however, the device can be disassembled and repaired. This is especially important for the correction of discs having invisible cracks and other irregularities which only show up during use. These cannot be corrected in those devices using cementing techniques even if they are immediately apparent while in the present construction if such irregularities are detected upon testing after assembly the device can be disassembled and the piezoelectric disc replaced with a new one.

Figure 4:
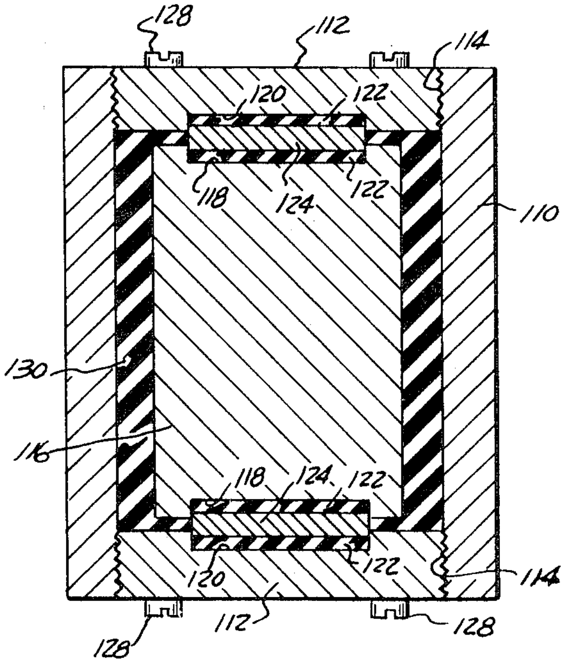
FIG. 4 is a longitudinal cross-sectional view of the device of FIG. 3 enlarged somewhat for purposes of clarity.
Figure 3:
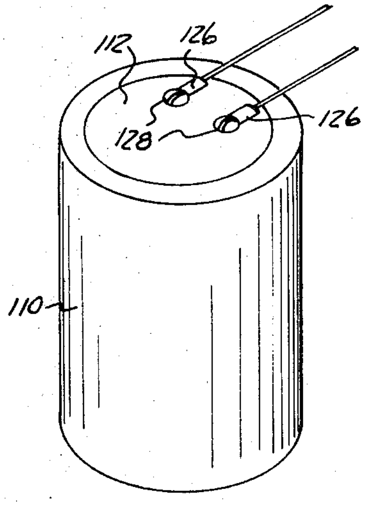
FIG. 3 is a perspective view of an accelerometer transducer device utilizing the mounting means of the present invention.

FIGS. 3—4 illustrate the mounting means of the present invention utilized in another type of transducer device. The device therein shown is an accelerometer, a transducer device for measuring acceleration. The device utilizes a pair of piezoelectric elements and a movable mass member intermediate the elements. As the device is subjected to acceleration forces the pressure against the adjacent faces of one of the piezoelectric elements is increased and the pressure against the adjacent face of the opposite piezoelectric element is decreased. These pressure changes produce voltage changes in the circuits connected with the piezoelectric elements and these changes are measured to determine the acceleration rate.

The accelerometer preferably comprises a tubular housing 110 closed at each end by covers 112. The covers 112 are preferably externally threaded and are received by threads 114 formed on the inner surface at each end of the tubular member 110.

A cylindrical mass member 116 is carried within the tubular housing 110 and is provided at each end with a central circular cavity 118. The covers 112 are provided with similar cavities 120 and rubber discs 122 like the discs 24—26 described above are disposed in the cavities 118 and 120. Piezoelectric discs 124 are disposed intermediate the rubber discs 122 at each end of the member 116.

Each of the discs 124 has its opposite faces connected across an electrical circuit in the manner described above with the connection being through the conductive rubber discs 122. Faces of like polarity of the discs 124 are connected to each other and the discs 124 are arranged so that when one of the discs expands the other contracts thereby reducing the strain on the mounting structure. Contacts 126 connect with screws 128 for this purpose. The spaces between the member 116 and the housing 110 are filled with a nonconductive rubber material 130 as described above.

The mounting means of the present invention has additional advantages in a transducer device of the type illustrated in FIGS. 3—4. In this device it is essential that the pressures produced by the mass member 116 be evenly distributed over the face of the piezoelectric disc. Uneven pressures not only produce inaccurate indications but also produce possible damage to the brittle ceramic discs.

It is apparent that I have described a new means for mounting the piezoelectric element in a transducer device which offers a number of important advantages over heretofore provided means for mounting such elements. It is also apparent that I have described but several embodiments of my invention and many changes and modifications can be made therein without departing from the spirit of the invention as expressed by the scope of the appended claims.

I claim:

1. Means for mounting a piezoelectric element within a transducer in association with an inertial mass so that movement of said mass relative to said transducer impose forces on said element, comprising members constructed of resilient electrically conducted material disposed on each side of said piezoelectric element and having surfaces in engagement with that element which generally conform to the adjacent surfaces of said element, at least one of said members having a surface, opposite to that which is in engagement with said element, in engagement with said inertial mass, means electrically connecting opposite sides of said piezoelectric element through said electrical conductive members, a housing having a cover, said piezoelectric element being disposed intermediate said inertial mass and said housing, means for securing said cover to said housing, and elastic nonelectrical conducting material disposed intermediate adjacent surfaces of said cover and said housing and said inertial mass.

2. In the transducer device:

a housing;

a cover;

means for mounting said cover to said housing;

a mechanical force-transmitting member disposed within said housing, said cover member and said force-transmitting member having opposing similar cavities;

resilient, electrically conducting members disposed in said cavities;

a piezoelectric element disposed intermediate said members, whereby upon mounting said cover member to said housing said members are urged into clamping engagement with said piezoelectric element;

means electrically connecting said members to a source of electrical power in order to apply electrical current to opposite faces of piezoelectric members;

and elastic nonelectrically conducting material disposed in the spaces intermediate adjacent surfaces of said housing and said cover member, and said force-transmitting member.

3. In a transducer device: a housing having a central cavity formed therein; an inertial mass disposed within said cavity; a piezoelectric element; a pair of resilient, electrically conducting members sandwiching said piezoelectric member between one surface of said cavity and said inertial mass; means electrically connecting said resilient, electrically conducting members to a source of electrical power; and elastic, nonelectrically conducting material disposed between all surfaces of the inertial member except those contacting said electrically conductive member and the walls of said cavity whereby said inertial mass is resiliently supported within said cavity by the combination of said elastic nonelectrically conducting material and said resilient electrically conducting member.